United States Patent [19]
Smolka et al.

[11] Patent Number: 5,956,448
[45] Date of Patent: *Sep. 21, 1999

[54] OPTICAL FIBER WAVEGUIDE

[75] Inventors: Francisco Martim Smolka; Robinson Luiz da Silva Braga, both of Campinas - Sp, Brazil

[73] Assignee: Algar S.A. Empreendimentos e Participacoes, Uberlandia, Brazil

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,050

[22] PCT Filed: Mar. 13, 1996

[86] PCT No.: PCT/BR96/00012
§ 371 Date: Jan. 23, 1997
§ 102(e) Date: Jan. 23, 1997

[87] PCT Pub. No.: WO96/30788
PCT Pub. Date: Oct. 3, 1996

[30] Foreign Application Priority Data

Mar. 28, 1995 [BR] Brazil ...................................... 9500990

[51] Int. Cl.⁶ ..................................................... G02B 6/22
[52] U.S. Cl. ........................................... 385/124; 385/126
[58] Field of Search ..................................... 385/123–124, 385/126, 127, 141–142

[56] References Cited

U.S. PATENT DOCUMENTS

| | | | |
|---|---|---|---|
| 4,709,987 | 12/1987 | Blackburn et al. | 385/141 |
| 4,755,022 | 7/1988 | Ohashi et al. | 385/124 |
| 4,852,968 | 8/1989 | Reed | 385/124 |
| 5,032,001 | 7/1991 | Shang | 385/124 |
| 5,483,612 | 1/1996 | Gallagher et al. | 385/124 |
| 5,649,044 | 7/1997 | Bhagavatula | 385/124 |

FOREIGN PATENT DOCUMENTS

| | | |
|---|---|---|
| 0 260 795 | 3/1988 | European Pat. Off. . |
| 22 34 664 | 1/1974 | Germany . |
| 38 20 217 | 12/1989 | Germany . |

OTHER PUBLICATIONS

Ninslie et al, "Monomode optical fibers with graded–index cores for low dispersion at 1.55 um", British Telecom Technology, vol. 2, No. 2, pp. 25–34, Apr. 1984.

Bhagavatula et al, "Bend–Optimized dispersion–shifted segmented core designs for specialized 1550–nm operation", Conference on Optical Fiber Communication, pp. 94–96, Feb. 1985.

*Primary Examiner*—Hemang Sanghavi
*Attorney, Agent, or Firm*—Abelman, Frayne & Schwab

[57] ABSTRACT

Optical waveguide of the type comprising a core (10) presenting a refractive index ($n_1$), maximal at least at its center; an optical cladding (20) involving core (10) and presenting a refractive index ($n_2$) constant along its diametral extension and lower than the maximum refractive index ($n_1$) of core (10) and further including a region defined by at least a stress-relieving intermediate portion (30) disposed between core (10) and the optical cladding (20), said intermediate portion presenting: a refractive index ($n_3$), maximal along its diametral extension, at the maximum equal to the refractive index ($n_1$) of core (10) and at least equal to refractive index ($n_2$) of optical cladding (20), so as to provide an increase in the cutoff wavelength; a thermal expansion coefficient and a viscosity adequate to reduce the internal stress levels at least in core (10) of the optical waveguide to values which permit the obtention of acceptable attenuation and chromatic dispersion for a wavelength region.

9 Claims, 1 Drawing Sheet

OPTICAL FIBER WAVEGUIDE

FIELD OF THE INVENTION

The present invention refers to a single-mode optical waveguide of the type used in optical communication systems, particularly in the 1550 nanometer spectral region.

BACKGROUND OF THE INVENTION

Optical waveguides or optical fibers have been widely used in communications, having become the preferred wide band communication media. Due to providing an increase in transmission capacity, the single-mode optical waveguide has received special attention.

During tha manufacturing phase of an optical waveguide, especially those made out of silicate glass and, more specifically, during the transformation of the preform, the matrix glass is submitted to softening temperatures over 2000° C., tensed and rapidly cooled generating, radially, internal stresses that give rise to structural defects that increase the waveguide optical loss (Ainslie, B. el al., 25, vol, 12, no. 2 British Telecom Technology, 1984)

The levels of internal stress on the optical waveguide increase with the stress applied during the drawing of said waveguide, the region of greatest internal stresses being the region between the core of the waveguide and the adjacent optical cladding region, since the thermal expansion coefficient and viscosity in these regions differ, originating stresses between these regions. Furthermore, these stress levels depend on the concentration of the dopants used in the glass composition of the optical waveguide, such as $P_2O_5$, F and $GeO_2$, during the construction of the refractive index profile.

It is known that when a certain region of an optical waveguide preform, with a lower viscosity than that of the cladding glass, is submitted to a drawing process, this region is put under compression. One of the known effects of submitting an optical waveguide to compression is the refractive index variation: the higher the level of compression, the higher the increase in refractive index (photoelastic effect).

For a given refractive index profile it is possible to control the viscosity and the thermal expansion index and, consequently, the internal of each of the core and cladding regions, through the adequate use of the materials during the chemical deposition step. This adequate combination of materials involves, for example, the control of the level of thermal expansion which will compensate or simply minimize the above-mentioned radial compression. This control of the thermal expansion can be obtained by means of a controlled incorporation of dopants, such as $GeO_2$, F and $P_2O_5$, together with the matrix glass $SiO_2$.

In a known solution, utilizing waveguides with a step-index profile, a decrease of the residual stresses after the manufacture of the optical waveguide is obtained during the chemical processing of the waveguide, controlling the use of fluorine and germanium in the core and the cladding of the waveguide, with $SiO_2$. This composition makes it possible to build structures where the viscosity is the same along the entire cross section of the waveguide, strongly reducing the stress problem. However, this methodology is only applicable to some optical waveguide manufacturing techniques.

Further to the problem of controlling internal stresses, other parameters relevant to the operation of optical waveguides must be observed, such as, low attenuation and chromatic dispersion, the latter associated to the form of the refractive index profile of the core.

In the efforts to broaden the single-mode optical waveguide bandwidth, the reduction in the chromatic dispersion of these optical waveguides at the operation region of the optical sources is of great importance.

Although the wavelength of 1330 nanometers presents, almost naturally, a low chromatic dispersion, the point of minimal attenuation of optical waveguides is at the spectral region of 1550 nanometers. Hence, solutions have been developed for obtaining optical waveguides presenting low chromatic dispersion at this wavelength. In order to obtain a chromatic dispersion near zero at this region, a triangular type of core refractive index profile is used, whereby a gradual variation of said index is obtained between the center of the core of the optical waveguide and the optical cladding. This profile is obtained by gradually doping germanium onto the core material of the optical waveguide.

Another solution so that the optical waveguides present low chromatic dispersion at the 1550 nanometer region is to reduce the diameter of the core. However, these solutions reduces the cutoff wavelength, that is, of the wavelength over which the waveguide presents a single light guidance mode, becoming a single-mode waveguide. This reduction in the cutoff wavelength causes an increase in attenuation at the 1550 nanometer region because a very extense distribution of the electrical field within the waveguide occurs, considerably extrapolating the optical waveguide core, making it sensible to effects occurring at its outer surface, such as micro and macro deformations by extraneous agents in situations at which the optical waveguides are normally subjected, such as processes to apply the primary and secondary coatings, processes to arrange them in reels, processes to arange the waveguide in an optical cable, processes to install the optical waveguides and/or cables in ducts or directly buried or as aerial cables.

The reduction in the cutoff wavelength shifts the region of curve of attenuation variation per wavelength, where there is a considerable increase in attenuation, to the 1550 nanometer wavelength region. The reduction in the attenuation levels due to micro and macrocurving effects have been obtained by increasing the cutoff wavelength through modifications of the basic triangular refractive index profile. Experimental essays show that, in a 1550 nanometer triangular profile single-mode waveguide, the attenuation induced on the waveguide decreases very fast in response to an increase in the cutoff wavelength [Smolka, F. M., X Outside Plant Seminar of the Telebrás System, 1993].

Different ways to increase the cutoff wavelength without losses in other features are known in the art. In one of these solutions, to triangular profile is added a concentrical high refractive index region, radially separated from the central profile (Bhagavatula, V. A. et al., Proceedings of the Optical Fiber Conference, 94, 1985). However, the cutoff wavelength of these optical waveguides is difficult to determine (Shah, V. et al., Proceedings of the Optical Fiber Communication Conference, 77, 1988).

In another known solution, the increase in the cutoff wavelength is obtained through the radial variation of the chemical composition of the materials that constitute the core and resulting in a double-core refractive index profile wherein a parabolical profile is superposed to a rectangular profile (Ohashi. N. et al., *Chronicals of the First Optoelectronic Conference*, p 22, 1986). However this solution does not solve the internal stress problems due to manufacturing.

Hence, the main object of the invention is to present an single-mode optical waveguide with a minimal and controllable internal stress due to manufacturing effects and to variations of the refractive index between the optical core and cladding.

A specific object of the invention is to present a single-mode optical waveguide which permits altering the viscosity and thermal expansion coeficients of the material out of which said optical waveguide is produced, resulting in a release of the stresses induced during the drawing of the optical waveguide.

Another object of the invention is to present a single-mode waveguide which, apart from the above-mentioned advantages, permits the obtention of a null chromatic dispersion in the 1550 nanometer spectral region and an increase in the cutoff wavelength, without affecting the signal attenuation in this region.

An additional object of the invention is to present a single-mode optical waveguide with the above-mentioned features and that further presents low sensibility to micro and macrobending effects that the optical waveguide is subjected to, during handling and use.

DISCLOSURE OF THE INVENTION

These and further objects are achieved by a single-mode optical waveguide, of the type that comprises a core presenting a refractive index $n_1$, maximal at least at its center; an optical cladding involving the core and presenting a constant refractive index $n_2$ along its diametral extension and lower than the maximum refractive index $n_1$ of the core, further including a region defined by at least an intermediate stress-relieving portion disposed in between the the core and the cladding and presenting: a refractive index $n_3$, maximal along its diametral extension, at the maximum equal to the maximum core refractive index $n_1$ and at least equal to the cladding refractive index $n_2$, so as to provide an increase in the cutoff wavelength; a thermal expansion coefficient and a viscosity adequate to reduce the internal stress levels at least at the core of the optical waveguide to values which permit obtaining acceptable attenuation and chromatic dispersion for a wavelength region.

Hereby a region is obtained, between the optical core and cladding, where the residual stresses are minimal, reducing the sensibility of the optical waveguide to effects due to the manufacturing process, mainly at the guide-stretching step.

BRIEF DESCRIPTION OF THE DRAWINGS

The invention will now be described based on the attached drawings, wherein.

BEST MODE OF CARRYING OUT THE INVENTION

Figure 1:
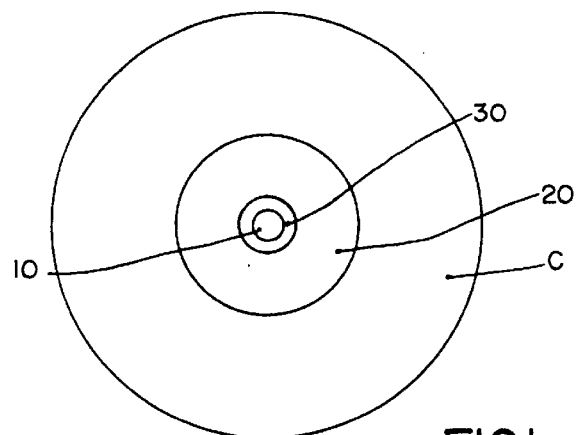
FIG. 1 represents, schematically, a cross-section view of an optical waveguide according to the present invention.

According to the figures, an optical waveguide consisting of a core in transparent glass 10 and presenting a maximum refractive index $n_1$, externally involved by an optical cladding 20, the refractive index, $n_2$, of which is lower than the core refractive index, $n_1$ and constant along its entire diametral extension is illustrated. The assembly is involved by an external clad C.

Between core 10 and optical cladding 20 the optical waveguide of the invention preferably includes an intermediate portion region 30 interfacing core 10 and cladding 20, forming a tubular covering in transparent material such as glass, and which is incorporated to the core 10 and cladding 20 assembly during a preform phase in glass, typical of the known processes for obtaining optical waveguides.

This interface 30 defines, physically, a core 10 and optical cladding 20 transition region with viscosity and thermal expansion coefficient features which, during the drawing of the optical waveguide, minimizes the internal stresses of the latter, at least in its core, apart from increasing the cutoff wavelength, so as to permit, preferably in the 1550 nanometer wavelength region an attenuation value acceptable in optical waveguide communication applications and, maximum, around 0.22 db/km.

This intermediate portion region 30 presents physico-chemical features which, further to permitting the control of the viscosity and thermal expansion coefficient, permits obtaining a refractive index variation between the center of core 10 and optical cladding 20 so that, at the spectral region between 1530 and 1570 nanometers and, preferably, at 1550 nanometers results in a substantially null chromatic dispersion. This control is obtained chemically during the chemical deposition step by using $GeCl_4$ together with other materials such as $SiCl_4$, $POCl_3$, and fluorine-containing materials such as, for example, $CCl_2F_2$, $SiF_4$, $C_2F_6$, etc.

In a preferred and illustrated embodiment, the core and cladding transition region includes an intermediate portion 30 presenting a refractive index, progressively radially and downwardly variable from a maximum refractive index value $n_3$ and lower than the maximum core refractive index $n_1$.

In the considered core refractive index profile, preferably triangular, the refractive index variation of the intermediate portion region results in a triangular refractive index profile, presenting a refractive index variation ratio per radial length unit lower than the refractive index ratio per said radial unit of the refractive index profile of core 10.

Figure 2:
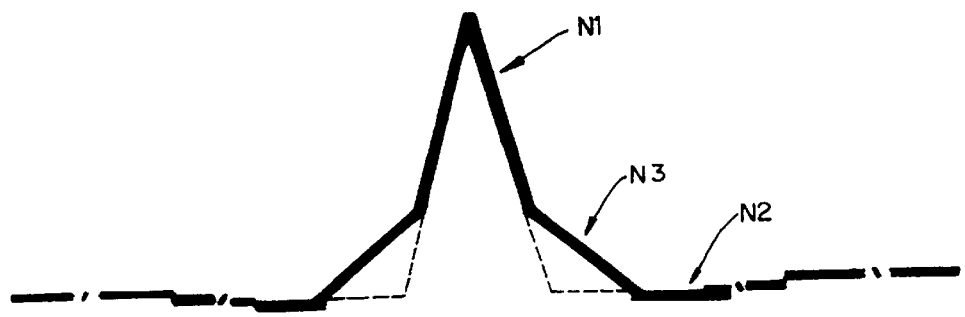
FIG. 2 represents, schematically, the variation of the refractive index of an optical waveguide, according to the present invention.

For an optical waveguide of the actual state of the art, the variation of the refractive index for this waveguide from the center of its core 10 to the core and optical cladding 20 transition region, occurs gradually producing a triangular-type refractive index profile, such as that illustrated in broken line in FIG. 2. This illustrated triangular profile, permits an adequate chromatic dispersion at 1550 nanometers and a modal field diameter that avoids high losses when two optical waveguides are spliced together, however presenting a low cutoff wavelength.

In the preferred and illustrated embodiment, the refractive index presents a progressive and continuous linear variation along the radial direction of the intermediate portion.

In a preferred and illustrated intermediate portion region 30 embodiment, the refractive index profile of the optical waveguide is of the compound triangular type, differing from the usual simple triangular profile of the actual state of the art, due to resulting from the superposition of triangular profiles. With this superposed profile, the radial variation of the refractive index will present, according to the illustration, two different behaviours from the center of the waveguide to internal border of its optical cladding 20.

The gradual variation of the refractive index at the intermediate portion contributes to increase the cutoff wavelength, improving the confinement of the guided light and, consequently, reducing the waveguide sensibility to micro and macrobending. Although these can be obtained through a chemical variation of a core-cladding transition zone, this solution does not solve the previously mentioned internal stress problems and, consequently, the attenuation problems at a given wavelength.

In the present solution, interface 30 can be chemically altered to improve the further above-mentioned variables.

In the construction of interface 30 the same materials can be used as those empployed for the optical cladding ($SiCl_4$, $POCl_3$ and a fluorine-containing compound such as $SiF_4$, $CCl_2F_2$, or $C_2F_6$), as long as not necessarily in the same quantities as those used in said optical core 20.

According to the present invention, it was observed that through the incorporation, at a determined step of the process of obtention of interface 30, of $GeO_2$ to the composition of said interface 30, one can adjust the refractive index profile as well as the viscosity and thermal expansion coefficient of the glass, so as to construct a material simultaneously compatible with core 10 and with optical cladding 20.

Although only one solution is illustrated for an intermediate portion region between the core and the optical cladding, it should be understood that the objects of the present invention can be achieved by presenting, in the region between the core and the optical cladding, a plurality of mutually adjacent intermediate portions each of which presenting an individual variation in the refractive index, viscosity and thermal expansion which, apart from permitting relief of stresses, permits the obtention of an increase in the cutoff wavelength with an attenuation reduction at the desirable wavelength region. The values of the thermal expansion coefficient and viscosity should, at least at the interface region adjacent the core, present values close to those of the core, so as to provide hereto, low levels of internal stress.

Furthermore, in a constructive variation, each intermediate portion can present a constant refractive index, granted that it varies along the core optical cladding intermediate region downwards and progressively and, in some cases also continuously, or further that each intermediate portion of said region varies progressively along its extension, in a continuous way or not relatively to the adjacent regions. The refractive index variation can present a non-linear behaviour, such as preferred and illustrated, resulting in a not necessarily linear superposed refractive index profile. In these constructions, at least in the intermediate portion adjacent the optical cladding, the refractive index $n_3$ should present a variation ratio which decreases as the radial distance relatively to the core of the optical waveguide increases.

We claim:

1. An improved optical fiber waveguide, comprising a core (10) presenting a refractive index ($n_1$), maximal at least at its center; an optical cladding (20) surrounding said core (10) and presenting a refractive index ($n_2$) constant along its diametral extension and lower than the maximum core refractive index ($n_1$), and a region is included defined by at least one stress-relieving intermediate portion (30) disposed between said core (10) and said optical cladding (20), so as to provide an increase in the cutoff wavelength; and a thermal expansion coefficient and a viscosity adequate to reduce the internal stresses at least in said core (10) of the optical fiber waveguide to values which permit the attainment of acceptable attenuation and chromatic dispersion for a wavelength region, wherein the improvement comprises said at least one intermediate portion (30) presenting: a refractive index ($n_3$) at the maximum equal to the maximum refractive index ($n_1$) of core (10) and at the minimum at least equal to the refractive index ($n_2$) of said optical cladding (20), said refractive index ($n_3$) continually decreasing as a radial distance from said center of said core (10) increases from a first radial distance from said center of said core (10) to a second radial distance from said center of said core (10), said at least one intermediate portion (30) bordering said core (10) at said first radial distance and said at least one intermediate portion (30) bordering said optical cladding (20) at said second radial distance.

2. An improved optical fiber waveguide, according to claim 1, characterized in that the refractive index ($n_3$) at the intermediate portion region (30) varies radially, downwardly and progressively.

3. An improved optical fiber waveguide, according to claim 2, characterized in that the refractive index ($n_3$) of said at least one intermediate portion (30) varies radially, downwardly and progressively.

4. An improved optical fiber waveguide, according to claim 3, characterized in that the refractive index ($n_3$) of intermediate portion (30) varies at a refractive index variation ratio per radial distance unit, at least at intermediate portion (30) adjacent to optical cladding (20), lower than the core refractive index ($n_1$) variation per radial distance unit, said variation ratio decreasing as the radial distance increases relatively to core (10) of the optical waveguide.

5. An improved optical fiber waveguide, according to claim 4, characterized in that the variation of the refractive index ($n_3$) of intermediate portion (30) produces a refractive index profile resulting from a superposition of profiles and presenting a maximum value lower than the maximum value of the core refractive index ($n_1$).

6. An improved optical fiber waveguide, according to claim 5, characterized in that it presents a double refractive index profile obtained by the superposition of a triangular profile corresponding to the variation of refractive index ($n_3$) of intermediate portion (30), and a triangular profile of the variation of refractive index ($n_1$) of core (10).

7. An improved optical fiber waveguide, according to claim 1, characterized in that it presents null chromatic dispersion in the region between 1530 and 1570 nanometers.

8. An improved optical fiber waveguide, according to claim 1, characterized in that the viscosity and the thermal expansion coefficient at the intermediate portion region (30) are sufficiently close to the corresponding viscosity and thermal expansion coefficient of core (10) so as to provide said reduced levels of internal stress.

9. An improved optical fiber waveguide, according to claim 1, characterized in that the refractive index ($n_3$) of said at least one intermediate portion (30) varies continuously.

* * * * *